United States Patent [19]
Amundsen

[11] Patent Number: 5,398,440
[45] Date of Patent: Mar. 21, 1995

[54] FISHING BOBBER WITH DRAG SCOOP FOR BAIT JIGGING

[76] Inventor: Walter M. Amundsen, 129 Overcup Dr., Sherwood, Ark. 72120

[21] Appl. No.: 981,430

[22] Filed: Nov. 25, 1992

[51] Int. Cl.⁶ .............................................. A01K 91/00
[52] U.S. Cl. ..................................... 43/44.9; 43/43.1; 43/44.87; 43/43.14; 43/44.91
[58] Field of Search ................. 43/4.5, 43.1, 43.14, 43/43.15, 44.87, 44.9, 44.91

[56] References Cited

U.S. PATENT DOCUMENTS

| | | | |
|---|---|---|---|
| 2,014,517 | 9/1935 | Beregow | 43/44.9 |
| 2,651,136 | 9/1953 | Kruze | 43/44.9 |
| 2,718,086 | 9/1955 | Miner | 43/43.14 |
| 2,825,175 | 3/1958 | Skvier | 43/44.91 |
| 3,010,244 | 11/1961 | Mattingly | 43/43.14 |
| 3,029,544 | 4/1962 | Dimatteo | 43/44.9 |
| 3,990,172 | 11/1976 | Hagquist | 43/43.14 |
| 4,359,836 | 11/1982 | Yuji | 43/44.87 |
| 4,635,392 | 1/1987 | Wirkus | 43/44.9 |

*Primary Examiner*—Kurt Rowan
*Attorney, Agent, or Firm*—Dickinson, Wright, Moon, Van Dusen & Freeman

[57] ABSTRACT

An improved fishing bobber has an upward facing concave hydrodynamic drag scoop underneath a buoyant body, and structure to slip-fit a fishing line through the bobber to a non-buoyant lure. The lure may be raised and lowered while the bobber is positionally restrained by the drag scoop. A method of fishing with the bobber and scoop, and a method of making the improved bobber are provided.

1 Claim, 2 Drawing Sheets

U.S. Patent  Mar. 21, 1995  Sheet 1 of 2  5,398,440
FIG. 1
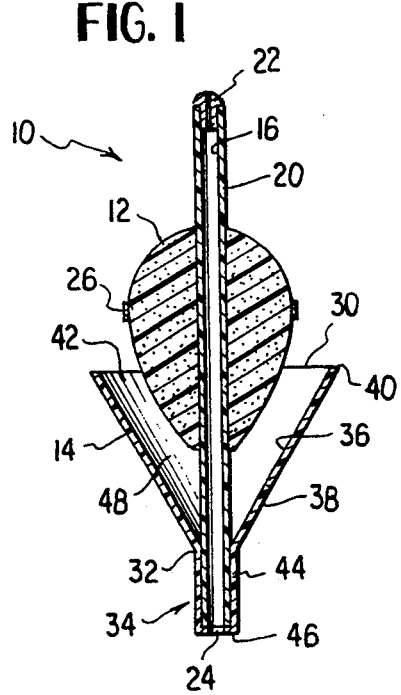
FIG. 7
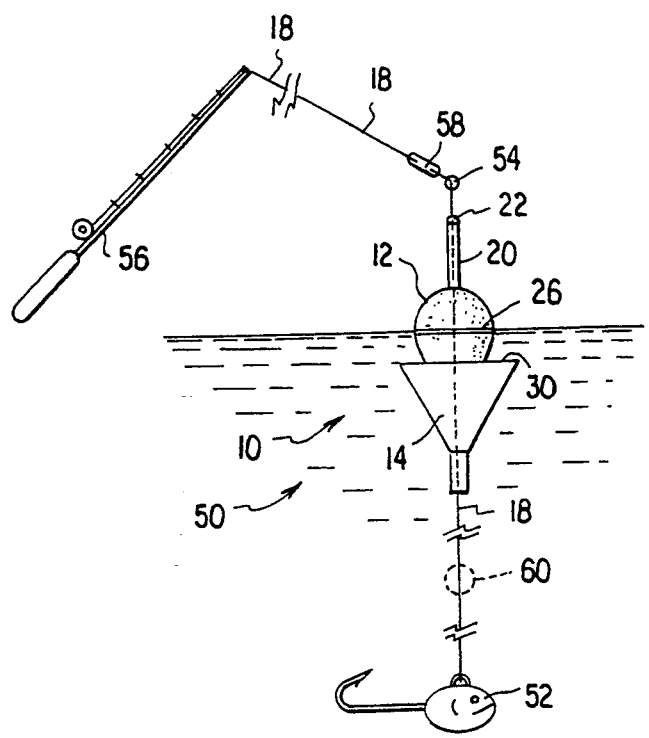
FIG. 2
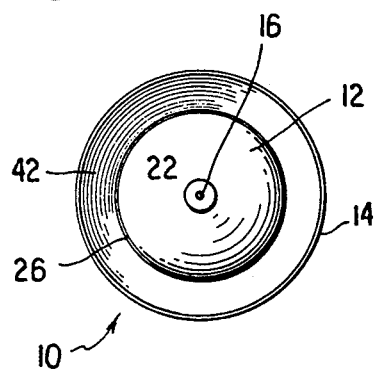
FIG. 8
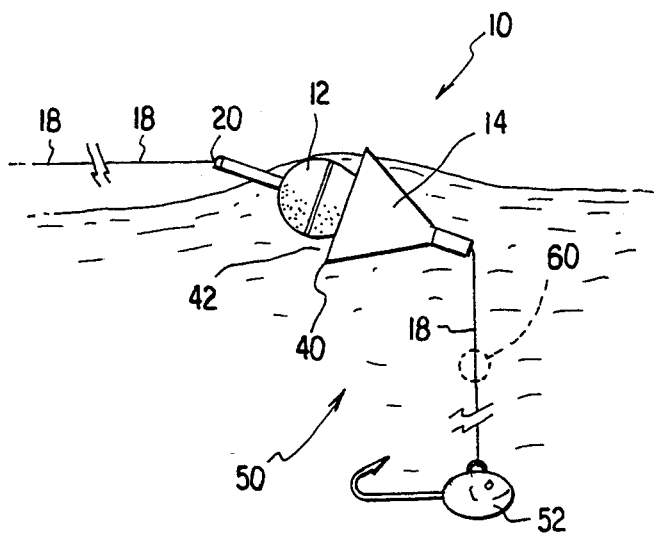
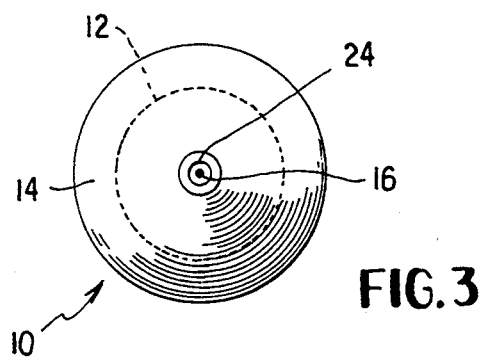
FIG. 3

FISHING BOBBER WITH DRAG SCOOP FOR BAIT JIGGING

FIELD OF THE INVENTION

This invention pertains to a new fishing bobber having a water drag scoop for holding position in water, and to methods of using and making this new type of bobber.

THE PRIOR ART

Fishing bobbers are old and well known, and the art is highly developed. The use of slip bobbers is known. In a slip bobber, the line is fed through the bobber and a stop which maybe a tied knot, or other structure, stops against the top of the bobber and causes the line and lure to hang from the bobber. The lure is non-buoyant and sinks. When the user pulls the line in, the lure is pulled upward as the line is pulled through the slip bobber.

One of the problems is that as the line is pulled, the bobber moves across the water and will not hold position.

A second problem is that wind blows the bobber downwind and moves the bobber and lure.

OBJECTS OF THE INVENTION

It is an object of this invention to provide a new and improved fishing bobber having a water drag scoop for positional restraint of the bobber in water.

It is an object of this invention to provide a new and improved fishing rig including a drag scoop to restrain a bobber in position in water.

It is an object of this invention to provide a new water drag scoop for a fishing bobber.

It is an object of this invention to provide a new method of using a fishing bobber with a water drag scoop.

It is an object of this invention to provide a new bobber having a buoyant body, a water drag scoop secured to the bottom of the body.

It is an object of this invention to provide a new method of making a bobber with an integral water scoop drag.

SUMMARY OF THE INVENTION:

In accordance with the principles of this invention, a fishing bobber has a buoyant float body, a water drag scoop secured with respect to the body, and structure for running a fishing line through the body and the scoop.

A fishing rig has a bobber with a float and a water drag scoop, a fishing line slip-fitted through the bobber, a lure securement structure, a retrieval stop between the lure end and the bobber, and a hanging stop on the line above the bobber.

A thermally molded non-buoyant bobber water drag scoop has a concave funnel, and structure for locating, fixing and securing the scoop to a fishing bobber.

A method of fishing has the steps of rigging a fishing line with a buoyant bobber body and a non-buoyant lure, providing a water drag scoop attached to the bobber, deploying the line, bobber, scoop and lure in water, suspending the lure from the bobber, pulling the line inward from the bobber, elevating the lure, snagging the drag scoop in the water and restraining movement of the bobber across the water, and pulling the line and raising the lure while the bobber is positionally restrained in the water by the scoop.

A fishing bobber has a tubular central shaft, a fishing line guidestop in the shaft, a buoyant float body secured to the shaft, a non-buoyant water drag scoop below the body and secured to the shaft, and structure below the scoop defining a downward facing line outlet from the bobber.

A method of making a new fishing bobber has the steps of securing a non-buoyant water drag scoop to a buoyant float body, forming a water drag chamber.

These and other objectives and advantages will become manifest to those versed in the art, upon review and use of the teachings herein.

ON THE DRAWINGS

FIG. 1 is an elevational side view in section, of preferred embodiment of the improved fishing bobber of this invention;

FIG. 2 is a top view of the structure of FIG. 1;

FIG. 3 is a bottom view of the structure of FIG. 1;

FIG. 7 is an elevational view of a fishing rig using and deploying the structure of FIG. 1; and FIG. 8 is an elevational view of the rig of FIG. 7 during the step of lure elevation.

DESCRIPTION OF THE PREFERRED EMBODIMENT

Figure 4:
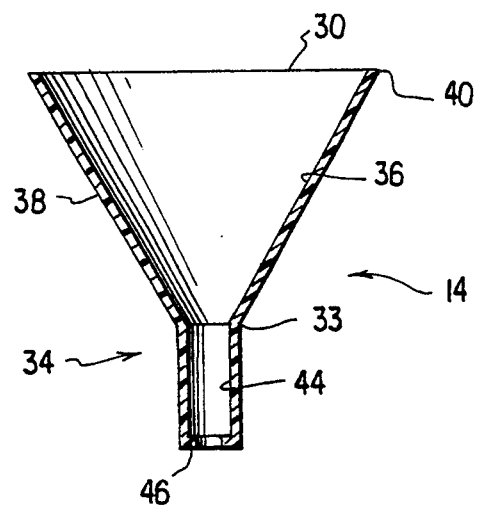
FIG. 4 is an elevational view in section of the scoop in the structure of FIG. 1.

In accordance with the principles of the present invention, the preferred embodiment of an improved fishing bobber is shown in FIGS. 1, 7, & 8 and generally indicated by the Numeral 10. The bobber 10 includes a buoyant float 12, a water drag scoop 14 (like a sea anchor) below the float body 12, and a line passageway 16 in which a-fishing line 18 is to be slip-fitted.

A central elongate, relatively upright structural tube forms a central shaft 20 of the bobber 10 and preferably has within itself the line passageway 16. At the top end of the shaft will be a fishing line guidestop 22, and at the bottom end will be a fishing line outlet 24. The buoyant float body 12 is typically egg shaped with a fine acute lower portion and a blunt obtuse top portion, and has an intended waterline 26 which is most often operatively determined and cosmetically indicated. The body 12 typically is about mid-height on the shaft 20, and exposed portions of the shaft 20 extend both upward and downward outside of the body 12.

An important part of this invention is the water drag scoop 14 for holding the bobber 10 in position in the water. The scoop 14 has a relatively large diameter top end 30, and a relatively small diameter bottom end 32 which adjoins to structure 34 for securing scoop 14 to the shaft 20. The scoop 14 has an upper concave interior side 36 that is spaced below and faces upward toward the float body 10. The lower and outer side 38 has a convex surface which points downward and away from the float body 12. The scoop 14 is generally funnel shaped and the bottom end 32 is preferably fluidly closed to the shaft 20. The scoop concave interior side 36 and convex lower side 38 both preferably have an included angle which is acute, this scoop acute angle is at least as great as any acute angle on the bottom of the float body 12 so that the scoop concave interior side 36 is either parallel to or outwardly divergent from the float body 12. In between the float body 12 and the scoop perimeter edge 40 is an annular water inlet 42 into a water drag chamber 48 in the space between the float body 12 and the scoop concave side 36. The scoop perimeter edge 40 and the annular water inlet 42 are both below the water line 26 of the bobber 10. The bottom of the scoop 14 is preferably closed so that it positively holds and captures water. The scoop 14 is non-buoyant and preferably transparent.

As shown in FIGS. 2 & 3, the structures of the float body 12, scoop 14 and shaft 20 are preferably concentric about a functional upright axis.

In the scoop 14 as shown in FIGS. 1 and 4, an originally discrete scoop 14 is thermoplastic or a thermoplastic rubber (TPR) and made by a thermal molding process. The scoop 14 has a central hub 44 precisely fitted to friction fit, solvent weld, sonic weld, snap on to, or by other conventional means be secured to the shaft 20. The hub 44 has a stop 46 to locate the scoop 14 along the lengths of the shaft 20. As herein shown, the shaft 20 is below the concave side 36.

Figure 5:
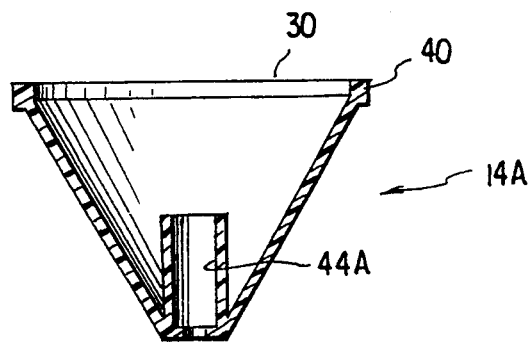
FIG. 5 is an elevational view in section of an alternative scoop.

In FIG. 5, an alternative preferred scoop 14A is shown wherein the hub 44 is inside of the concave side 36. As herein shown, the perimeter edge may also have a circumstantial strengthening bead.

Figure 6:
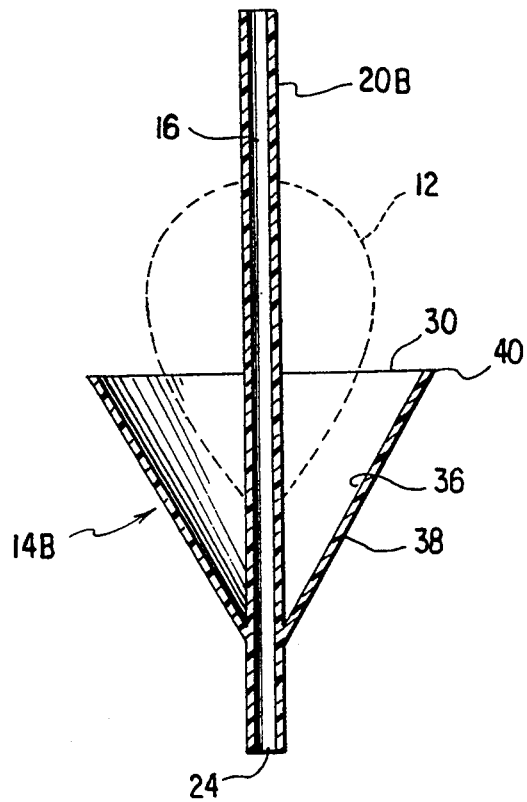
FIG. 6 is an elevational view in section of a further alternative scoop.

The further alternative scoop 14B shown in FIG. 6 is an integral assembly of shaft 14B and scoop 14B, either by a single manufacturing process, or by subsequent assembly of components. The float body 12 is shown in dotted line where it would be pressed or snapped or otherwise assembled and retained onto the shaft 14B.

In FIG. 7, an assembled fishing rig 50 is shown wherein a length of fishing line 18 is slip-fitted through the passageway 16, and a non-buoyant, i.e. a jig, lure 52 is attached at the outer end of line 18, and some type of a physical hanging stop 54 is attached to the line 18 above the bobber 10. The lure 52 and that part of the line 18 below the hanging stop 54, hang at a predetermined depth in water as the hanging stop 54 engages and abuts against the guidestop 22. The length of line 18 between the hanging stop 54 and lure 52 determines the depth. The remainder of the line 18 is then led to a fishing implement 56. A snap connector 58 may be installed in the line 18, and the hanging stop 54 may be a small ring, enabling rapid changing of the entire rig 50 to a relatively new rig 50A (not shown). An optional retrieval stop 60 may be installed on the line 18 between the lure 52 and the bobber 10.

In the use of the bobber 10 and rig 50, the bobber 10 is rigged into the rig 50 and deployed in the water. The lure 52 hangs at the predetermined depth as determined by the length of line 18 set between the lure 52 and the hanging stop 54. The bobber 10 settles down in the water to a functional waterline 26. The scoop perimeter edge 40 and all of the scoop 14 structure is below the water level and totally submerged. To elevate the lure 52, the user pulls on or retrieves the line 18 and pulls it upward through the bobber 10. Without the retrieval stop 60, the lure 52 will rise up until it abuts against the bottom of the bobber 12. Therefore its vertical rise and subsequent decent is the total length of the line 18 between the lure 52 and the hanging stop 54, less the height of the bobber 10. When the optional retrieval stop 60 is utilized on the line 18, the rise and subsequent drop of the lure 52 will be the length of line 18 between the bobber 10 and the retrieval stop 60.

Further use and operation of the bobber 10, and practice of the inventive method of using the improved bobber 10 with the scoop 14 is best shown in FIG. 8 wherein the pull on the line 18, or surface winds, has caused the bobber 10 to tilt over on its side. The scoop 14 also tilts over and presents its submerged and fully exposed perimeter edge 40 and water inlet 42 to the water. Whereupon, the scoop 14 begins to significantly drag in the water and restrain lateral movement of the bobber 10 across the top of water and toward the user. The bobber 10 is hydro-dinamically held in place as the line 18 is pulled in to elevate the lure 52. This enables release of the line 18 and the lure 52 to pull the line 18 back down and into very close to the position in which the lure 52 started. It is easy to determine when either the lure 52 or retrieval stop 60 makes contact with the bobber 10, as a distinctive "clunk" occurs that is easily felt at the fishing implement 56.

Upon feeling the "clunk", the line 18 can be released to drop the lure 52, or the line 18 may be further retrieved to move the bobber 10 before dropping the lure 52.

If a fish is engaged, the bobber 10 with the scoop 14 descends easily, but requires additional force to retrieve. The fish can no more feel the bobber 10 and scoop 14, than a conventional bobber without a scoop.

When the bobber 10 and scoop 14 are reeled in, the scoop 14 holds water that can be shaken out or left in the open water drag chamber 48. The method further includes the step of casting the rig 50 with the bobber 10 still having water in the open drag chamber 48. This retained water ballasts the bobber 10 and significantly increases effective casting distance with the rig 50.

Many other advantages, features and additional objects of the present invention will become manifest to those working in and/or versed in the art upon making reference to and use of this detailed description and accompanying drawings in which the preferred embodiment incorporating the principles of the present inventions are set forth and shown by way of illustrative example.

Although other advantages will be found and realized and various modifications will be suggested by those working in and/or versed in the art, be it understood that I embody within the scope of the patent hereon, on such embodiments as reasonably and properly come within the scope of my contribution to the art.

I claim as my invention:

1. A fishing bobber comprising
   a) a tubular central shaft for receiving a fishing line and having a line inlet;
   b) a buoyant float body secured to said shaft, said body having an upper end and a lower end;
   c) a line guidestop secured to said shaft above said body upper end;
   d) a non-buoyant thermally molded water drag scoop structurally fastened to the bottom end of said tubular central shaft, said scoop having a relatively large diameter top end, a relatively small diameter bottom end, and a concave side between said top end and said bottom end, said concave side facing upward, toward said buoyant float body and forming an annular water inlet about said body; and
   e) means in said shaft and below said scoop bottom end defining a downward facing line outlet from the bobber, wherein said shaft, said line guidestop, and said line outlet permit said line to pass therethrough in a slip fit to permit a lure attached to said fishing line to be elevated substantially with respect to said body and scoop by pulling on said fishing line.

* * * * *